US006678504B1

United States Patent
Toki

(10) Patent No.: US 6,678,504 B1
(45) Date of Patent: Jan. 13, 2004

(54) FOLDABLE HANDY PHONE

(75) Inventor: Nozomi Toki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/511,850

(22) Filed: Feb. 23, 2000

(30) Foreign Application Priority Data

Feb. 24, 1999 (JP) .......................................... 11/045817

(51) Int. Cl.⁷ ................................................. H04B 1/38
(52) U.S. Cl. ........................ 455/90; 455/575; 455/347; 455/350; 455/550; 379/433.01; 379/433.02; 379/433.13
(58) Field of Search ......................... 455/575, 90, 347, 455/350, 550; 379/433.01, 433.02, 433.13

(56) References Cited

U.S. PATENT DOCUMENTS

| | | | |
|---|---|---|---|
| 5,276,916 A | * | 1/1994 | Pawlish et al. |
| 5,442,814 A | | 8/1995 | Seo |
| 5,809,433 A | * | 9/1998 | Thompson et al. |
| 6,064,894 A | * | 5/2000 | Zurek et al. |
| 6,148,080 A | * | 11/2000 | Collin |
| 2001/0003707 A1 | * | 6/2001 | Moriya |

FOREIGN PATENT DOCUMENTS

| | | |
|---|---|---|
| GB | 2 293 518 A | 3/1996 |
| GB | 2 337 395 A | 11/1999 |
| JP | S61-198852 | 9/1986 |
| JP | S62-024749 | 2/1987 |
| JP | H03-039952 | 4/1991 |
| JP | 3-162025 | 7/1991 |
| JP | H07-025645 | 5/1995 |
| JP | 2570149 | 10/1996 |
| JP | H10-126469 | 5/1998 |
| JP | 10-304036 | 11/1998 |

* cited by examiner

Primary Examiner—Sinh Tran
Assistant Examiner—Huy Nguyen
(74) Attorney, Agent, or Firm—Scully, Scott, Murphy & Presser

(57) ABSTRACT

A foldable handy phone of the present invention includes a receiver case and a transmitter case hinged to each other. A piezoelectric device or similar sounding means is accommodated in the receiver case. A through hole is formed in the surface of the receiver case that faces the transmitter case when the handy phone is folded up. The through hole is communicated to a portion accommodating the sounding means. A groove is formed in the above surface of the receiver case and extends from the open end of the through hole to the end of the receiver case opposite to the end hinged to the transmitter case. When the sounding means produces an alert tone in the folded position of the handy phone, the alert tone is radiated to the outside via the groove.

5 Claims, 5 Drawing Sheets

FOLDABLE HANDY PHONE

BACKGROUND OF THE INVENTION

The present invention relates to a foldable handy phone.

It is a common practice with a foldable handy phone to hinge a receiver case and a transmitter case to each other. The receiver case accommodates a speaker or similar sounding means. A through hole is formed in the surface of the receiver case that faces the transmitter case when the handy phone is folded up. The through hole is communicated to the portion of the receiver case accommodating the sounding means.

The user of the above handy phone holds the open end of the through hole or earpiece portion to the ear in order to hear voice output from the sounding means. The maximum sound pressure level (SPL) to be output from the sounding means confined in a hermetic space is limited to about 120 dB or below in order to protect the ear drum from damage. It has been customary to dispose a ringer in either one of the receiver case and transmitter case independently of the sounding means. In the event of a call incoming, the ringer is driven to generate an alert tone for alerting the user to the call.

However, the handy phone equipped with the ringer in addition to the sounding means is large size, heavy weight, and high cost. In light of this, a sensor may be built in the earpiece portion for sensing the distance between the ear and the earpiece portion, so that the sounding means can output an alert tone with a greater volume when the above distance is great, as proposed in the past. Alternatively, the sounding means may function as a speaker at the same time to allow the user to converse without bringing the handy phone closer to the ear, as also proposed in the past.

A clearance more or less exists between the earpiece portion and the ear. The size of the clearance depends on the person, i.e., the shape of the ear and how tightly the earpiece contacts the ear. As the clearance and therefore the degree of sound leak increases, sound pressure in the low pitch range falls due to the variation of the acoustic characteristic, resulting in the noticeable variation of sound quality.

Japanese Patent Laid-Open Publication No. 10-304036, for example, teaches a preleak portion for reducing the above variation of sound quality and always implementing sound easy to hear for all persons. The preleak portion is provided in the earpiece portion for adequately causing sound to leak beforehand. With the preleak portion, it is possible to reduce the influence of the distance between the earpiece portion and the ear.

The sounding means assigned to conversation, but bifunctioning as alert tone generating means, obviates the need for a ringer. This kind of sounding means, however, must be accompanied by the sensor responsive to the distance between the earpiece portion and the ear, increasing the size, weight and cost of the handy phone.

The preleak scheme successfully reduces the variation of sound quality by causing sound to leak beforehand. However, some structure should preferably serve as the preleak portion at the same time in order to obviate the need for the preleak portion.

Technologies relating to the present invention are also disclosed in, e.g., Japanese Patent Laid-Open Publication No. 3-162025 and Japanese Patent No. 2,570,149.

SUMMARY OF THE INVENTION

It is therefore an object of the present invention to provide a small size, light weight and low cost foldable handy phone.

It is another object of the present invention to provide a foldable handy phone including sounding means for conversation capable of bifunctioning as a ringer.

It is a further object of the present invention to provide a foldable handy phone causing sound to adequately leak and thereby stabilizing sound quality.

A foldable handy phone of the present invention includes a receiver case, a transmitter case hinged at one end thereof to one end of the receiver case, and a sounding device disposed in the receiver case. A through hole is formed in the surface of the receiver case that faces the transmitter case when the receiver case and transmitter case are folded. The through hole is communicated to a portion accommodating the sounding device. A groove is formed in the surface of the receiver case and extends from the open end of the through hole to the other end of the receiver case.

The above groove may be replaced with a second through hole also formed in the receiver case and extending from the portion accommodating the sounding device to the other end of the receiver case.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
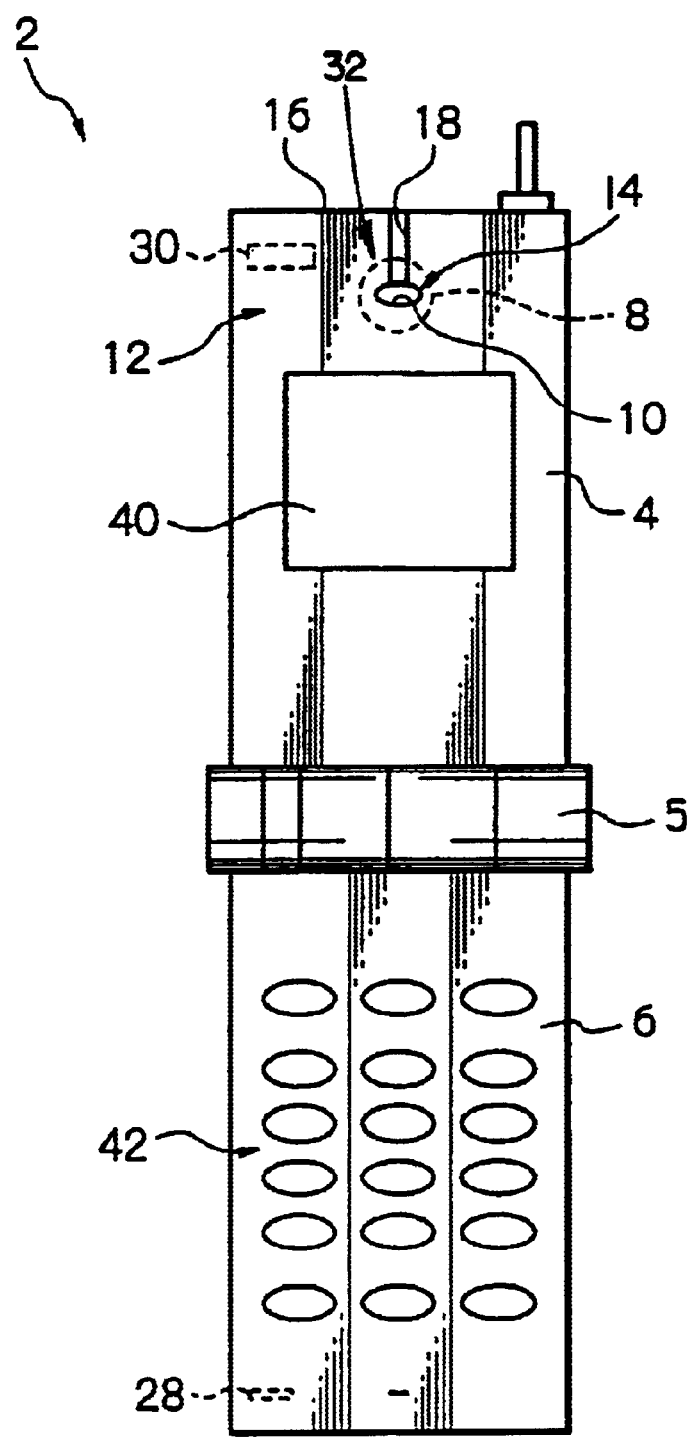
FIG. 1 is a plan view showing a foldable handy phone embodying the present invention.

Referring to FIG. 1 of the drawings, a foldable handy phone embodying the present invention is shown and generally designated by the reference numeral 2. As shown, the handy phone 2 includes a receiver case 4 and a transmitter case 6 having end portions thereof hinged to each other by a connecting member 5. An LDC (Liquid Crystal Display) 40 is mounted on the receiver case 4. An operating section 42 including a plurality of keys is arranged on the transmitter case 6. Sounding means 8 is disposed in the receiver case 4 and implemented by a piezoelectric device by way of example. A through hole 10 is formed in the surface 12 of the receiver case 4 which faces the transmitter case 6 when the handy phone 2 is folded up. The through hole 10 is communicated to a portion accommodating the sounding means 8.

A groove 18 is formed in the above surface 12 of the receiver case 4 and extends from the open end 14 of the through hole 10 to the end 16 of the receiver case 4 opposite to the hinged end. The groove 18 is open to the outside an the end 16 of the receiver case 4. A bore 20 (see FIG. 2) is formed in the receiver case 4 between the front face of the sounding means 8 and the surface 12 of the receiver case. The bore 20 is contiguous with the through hole 10. handy phone 2. As shown, the control device includes volume control means 22 for controlling the volume of sound to be output from the sounding means 8. Case position sensing means 24 determines whether or not the receiver case 4 and transmitter case 6 are folded up. When the receiver case 4 and transmitter case 6 are folded up, as determined by the case position sensing means 24, the volume control means 22 causes the sounding means 8 to output louder sound than when the two cases 4 and 6 are unfolded. Control means 26 includes a CPU (Central Processing Unit) and a ROM (Read Only Memory), not shown, and controls the entire handy phone 2.

As shown in FIG. 1, the case position sensing means 24 is made up of a lead switch 28 and a magnet 30 accommodated in the transmitter case 6 and receiver case 4, respectively. The lead switch 28 and magnet 30 face each other when the receiver case 4 and transmitter case 6 are folded. The lead switch 28 turns on when a magnetic field acts thereon.

Figure 2:
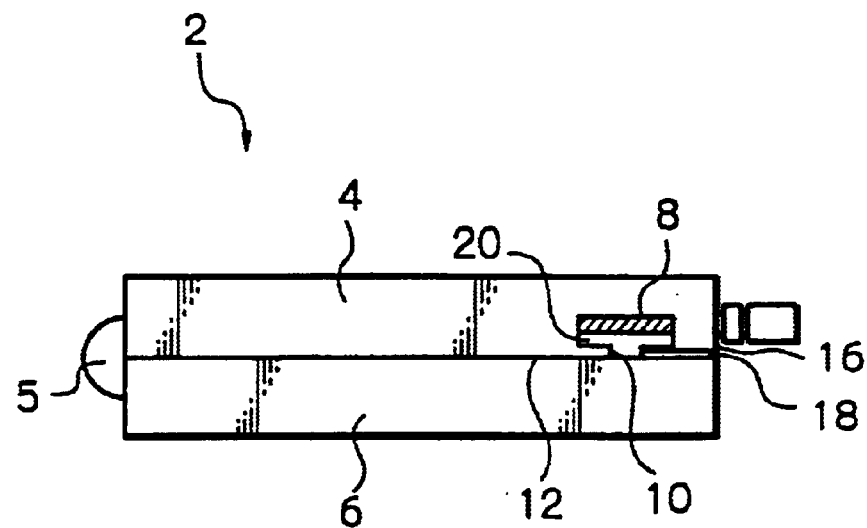
FIG. 2 is a side elevation showing the illustrative embodiment in a folded position.
Figure 3:
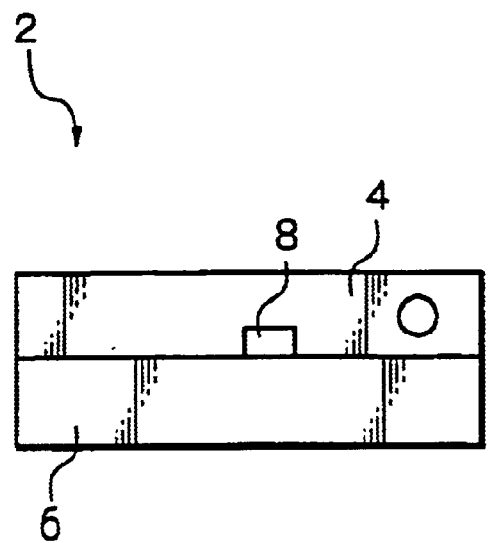
FIG. 3 is a side elevation as seen in a different direction from FIG. 2, also showing the illustrative embodiment in the folded position.

FIGS. 2 and 3 show the handy phone 2 in a folded position or stand-by position. In this position, the receiver case 4 and transmitter case 6 and therefore the lead switch 28 and magnet 30 accommodated therein face each other. The lead switch 28 therefore remains in an ON state due to the magnetic field of the magnet 30.

Figure 4:
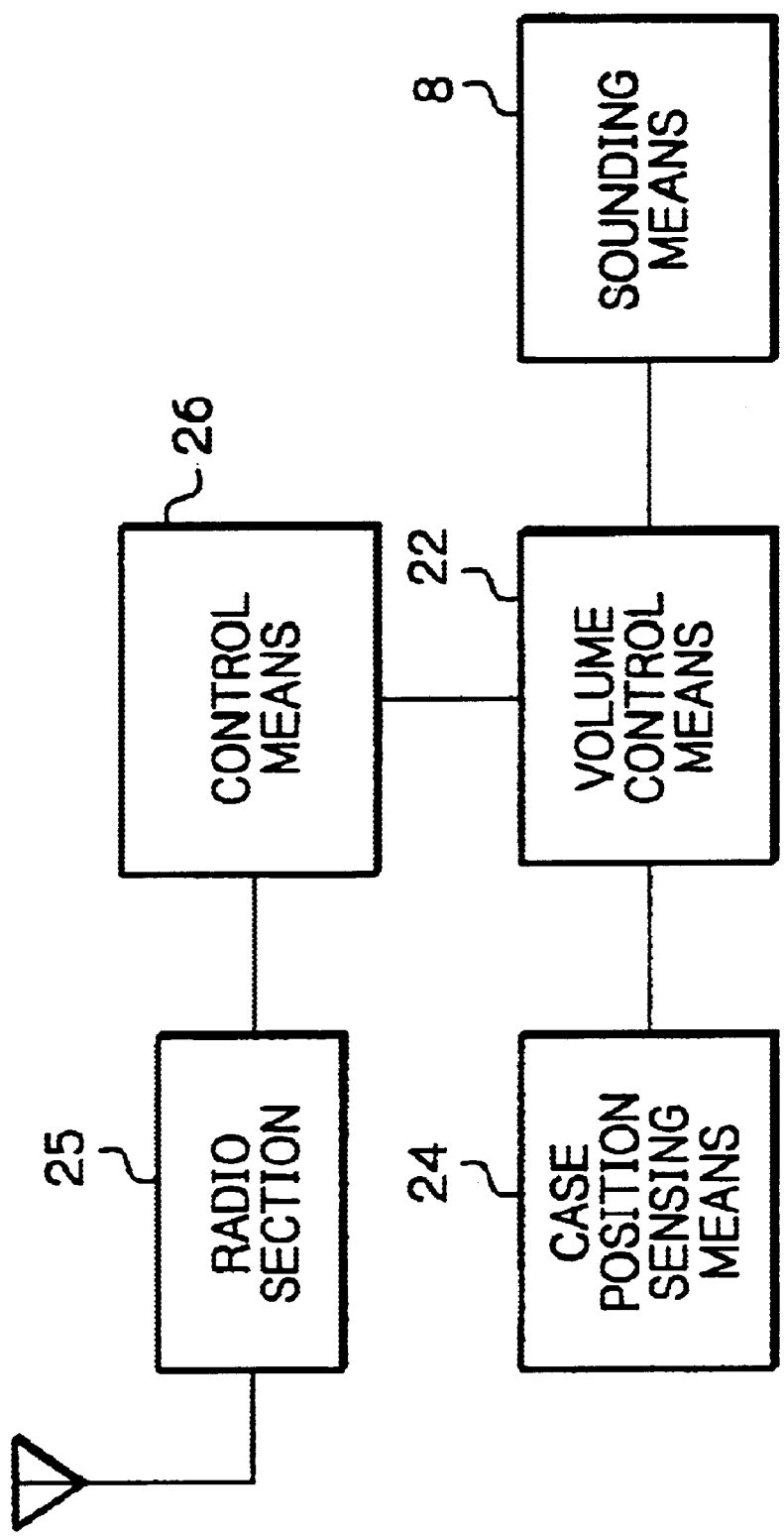
FIG. 4 is a block diagram schematically showing essential part of the illustrative embodiment.

Assume that a call meant for the handy phone 2 is received via an antenna and a radio section 25 shown in FIG. 4. Then, the control means 26 informed of the call by the radio section 25 generates an alert tone signal and delivers it to the sounding means 8 via the volume control means 22. At this instant, the volume control means 22 has determined that the handy phone 2 is folded in response to the output of the lead switch 28. The volume control means 22 therefore controls the sounding means 8 to output louder sound than when the handy phone 2 is unfolded. As a result, the sounding means 8 is driven by an alert tone signal output from the volume control means 22 and generates a louder alert tone.

The alert tone is radiated from the end 16 of the receiver case 4 to the outside of the case 4 via the bore 20, through hole 10 and groove 18. This allows the user of the handy phone 2 to easily hear such a loud alert tone despite the folded position of the phone 2 and see the receipt of a call.

So long as the handy phone 2 is folded up, conversation cannot be held on the phone 2. This, coupled with the fact that in such a condition the user does not hold the receiver case 4 to the ear, allows an alert tone with a sound pressure level (SPL) of 120 dB or above to be safely produced.

The illustrative embodiment is practicable with the case position sensing means, i.e., lead switch 28 and magnet 30 customarily arranged in a conventional handy phone. The sounding means 8 can therefore serve as a ringer at the same time and obviates the need for the conventional sensor for sensing the distance between the user's ear and an earpiece. This reduces the overall size, weight and cost of the handy phone 2.

On hearing the above alert tone, the user unfolds the handy phone 2 and then holds an earpiece portion 32 including the through hole 10 to the ear.

Even when the user puts the earpiece 32 tightly on the ear, the open end of the groove 18 allows sound to leak via the groove 18. In this sense, the groove 18 plays the role of a preleak portion. Consequently, although the user may vary the distance between the ear and the earpiece portion 32, sound quality changes little and remains stable.

Figure 5:
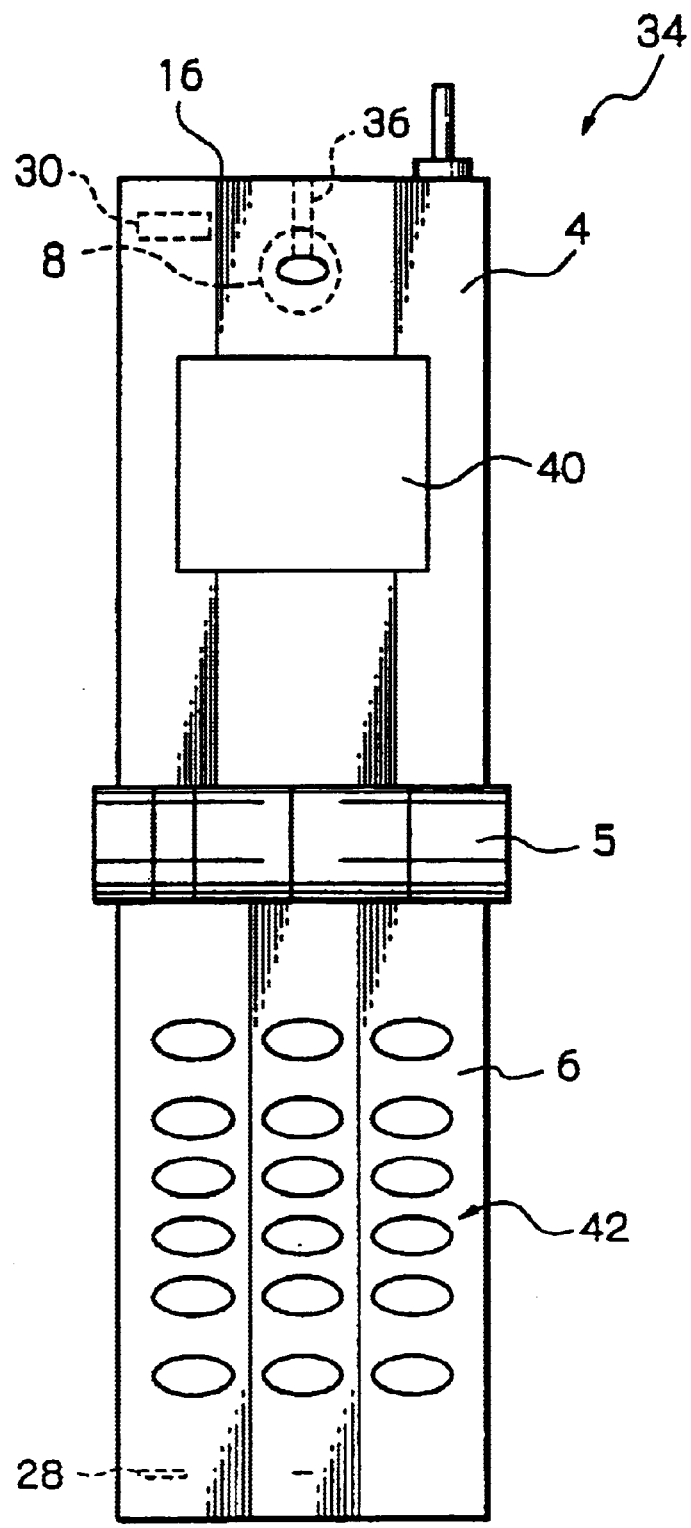
FIG. 5 is a plan view showing an alternative embodiment of the present invention.
Figure 6:
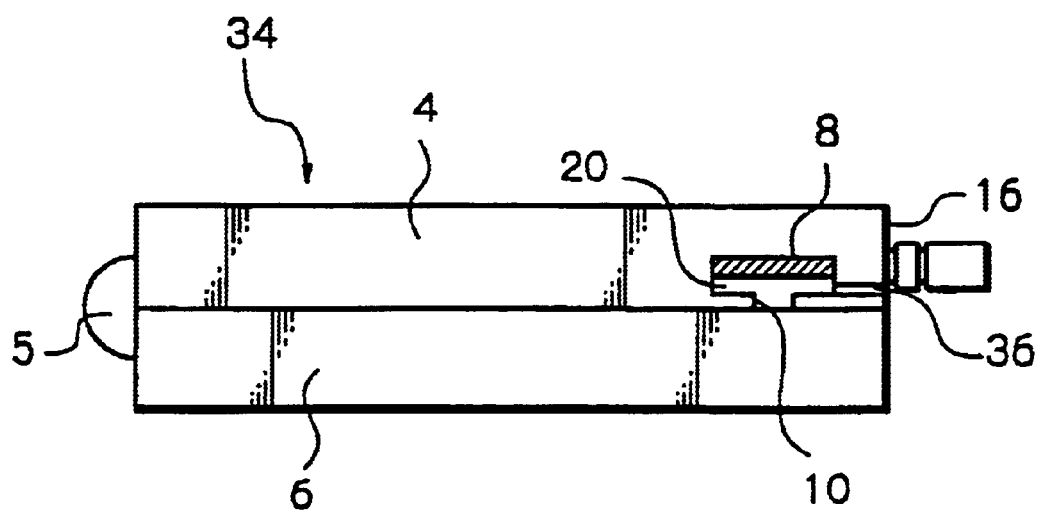
FIG. 6 is a side elevation showing the alternative embodiment in a folded position.
Figure 7:
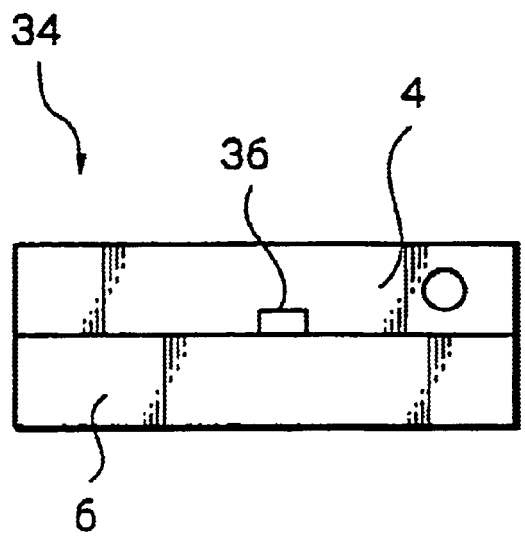
FIG. 7 is a side elevation as seen in a different direction from FIG. 6, also showing the alternative embodiment in the folded position.

An alternative embodiment of the present invention will be described with reference to FIG. 5. In the figures, identical reference numerals designate identical structural elements. As shown, a foldable handy phone 34 is identical with the previous handy phone 2 except that a second through hole 36 is substituted for the groove 18. The second through hole 36 is formed in the receiver case 4 and extends from the bore 20 (see FIG. 6) to the end 16 of the case 4 opposite to the hinged end in the same manner as the groove 18. With the second through bore 36 comparable in function with the groove 18, the illustrative embodiment achieves the same advantages as the previous embodiment.

In the embodiments shown and described, the sounding means 8 expected to output an alert tone may additionally function as a speaker in the folded position of the handy phone 2 or 34. This configuration will allow the user to hear voice without bringing the handy phone 2 or 34 closer to the ear.

In summary, it will be seen that the present invention provides a foldable handy phone allowing sounding means to output a louder alert tone when it is held in a folded position. Such an alert tone is radiated to the outside via a groove or a through hole formed in a receiver case, alerting the user of the handy phone to a call incoming. Because conversation cannot be held on the folded handy phone 2 and because the user is not expected to hold the folded handy phone to the ear, an alert tone with an SPL of 120 dB or above can be safely produced.

Further, the folded position of the handy phone can be sensed by a mechanism customarily included in a conventional foldable handy phone, obviating the need for an exclusive sensor responsive to the distance between the phone and the user's ear. Also, by providing sounding means with an additional ringer function, it is possible to reduce the size, weight and cost of the handy phone.

Moreover, even when the user puts the receiver case tightly on the ear, the open end of the groove or the through hole allows sound to leak. Consequently, although the user may vary the distance between the ear and the receiver case, sound quality changes little and remains stable.

Various modifications will become possible for those skilled in the art after receiving the teachings of the present disclosure without departing from the scope thereof.

What is claimed is:

1. A foldable handy phone comprising:
   a receiver case;
   a transmitter case hinged at one end thereof to one end of said receiver case;
   sounding means disposed in said receiver case;
   a through hole formed in a surface of said receiver case which faces said transmitter case when said receiver case and said transmitter case are folded, said through hole being communicated to a portion accommodating said sounding means; and
   a groove formed in said surface of said receiver case and extending from an open end of said through hole to the other end of said receiver case.

2. A handy phone as claimed in claim 1, wherein an end of said groove is open at said other end of said receiver case.

3. A handy phone as claimed in claim 1, further comprising a bore formed between a front face of said sounding means and said surface of said receiver case and communicated to said through hole.

4. A handy phone as claimed in claim 1, further comprising:

volume control means for controlling a volume of sound to be output from said sounding means; and case position sensing means for determining whether or not said receiver case and said transmitter case are folded;

said volume control means causing, when said case position sensing means determines that said receiver case and said transmitter case are folded, said sounding means to produce a louder sound than when said receiver case and said transmitter case are unfolded.

5. A handy phone as claimed in claim 4, wherein said case position means comprises a lead switch and a magnet one of which is accommodated in said receiver case and the other of which is accommodated in said transmitter case, said lead switch and said magnet adjoining each other when said receiver case and said transmitter case are folded.

* * * * *